United States Patent
Hess et al.

(10) Patent No.: US 7,505,143 B2
(45) Date of Patent: Mar. 17, 2009

(54) DYNAMIC REFERENCE PLANE COMPENSATION

(75) Inventors: Harald F. Hess, La Jolla, CA (US); Thomas Daniel Carr, Encinitas, CA (US); Romain Sappey, San Diego, CA (US)

(73) Assignee: KLA-Tencor Corporation, San Jose, CA (US)

( * ) Notice: Subject to any disclaimer, the term of this patent is extended or adjusted under 35 U.S.C. 154(b) by 216 days.

(21) Appl. No.: 11/130,830

(22) Filed: May 17, 2005

(65) Prior Publication Data

US 2006/0262291 A1  Nov. 23, 2006

(51) Int. Cl.
*G01B 11/02* (2006.01)

(52) U.S. Cl. .................................................. 356/505

(58) Field of Classification Search ................ 356/510, 356/499, 501, 505, 506, 507
See application file for complete search history.

(56) References Cited

U.S. PATENT DOCUMENTS

| | | | |
|---|---|---|---|
| 4,585,348 A | 4/1986 | Chastang | |
| 4,870,631 A * | 9/1989 | Stoddard | 369/18 |
| 4,873,430 A | 10/1989 | Juliana | |
| 5,189,481 A | 2/1993 | Jann | |
| 5,270,794 A | 12/1993 | Tsuji | |
| 5,280,340 A | 1/1994 | Lacey | |
| 5,392,116 A * | 2/1995 | Makosch | 356/495 |
| 5,416,594 A | 5/1995 | Gross | |
| 5,600,441 A * | 2/1997 | de Groot et al. | 356/492 |
| 5,610,897 A | 3/1997 | Yamamoto | |
| 5,633,747 A | 5/1997 | Nikoonahad | |
| 5,644,562 A | 7/1997 | de Groot | |
| 5,798,829 A | 8/1998 | Vaez-Iravani | |
| 5,864,394 A | 1/1999 | Jordan | |
| 5,880,838 A | 3/1999 | Marx | |
| 5,903,342 A | 5/1999 | Yatsugake | |
| 5,985,689 A | 11/1999 | Gofuku et al. | |
| 5,986,763 A | 11/1999 | Inoue | |
| 5,995,226 A | 11/1999 | Abe | |
| 6,081,325 A | 6/2000 | Leslie | |
| 6,184,992 B1 * | 2/2001 | Duran et al. | 356/507 |
| 6,687,008 B1 | 2/2004 | Peale | |
| 2001/0035960 A1 * | 11/2001 | Johnston | 356/507 |
| 2003/0184759 A1 * | 10/2003 | Hill | 356/487 |

* cited by examiner

*Primary Examiner*—Tarifur Chowdhury
*Assistant Examiner*—Jonathan M Hansen
(74) *Attorney, Agent, or Firm*—Luedeka, Neely & Graham, P.C.

(57) ABSTRACT

In one embodiment, a method of dynamic reference plane compensation, comprises impinging radiation from a first radiation source onto a surface of an object; generating an uncompensated measurement signal from radiation reflected from a first location on the surface and a second location; generating a compensation signal from radiation reflected from a third location and a fourth location on the surface; and generating a compensated measurement signal using the uncompensated measurement signal and the compensation signal.

17 Claims, 3 Drawing Sheets

DYNAMIC REFERENCE PLANE COMPENSATION

BACKGROUND

This invention relates to surface analysis techniques, and more particularly to dynamic reference plane leveling.

Numerous technical applications involve measuring aspects of a surface. For example, in the disk drive industry, determining the microscopic topology of a disk surface at various stages during production is becoming an increasingly important factor in estimating the likelihood of producing a favorable quality disk. Given the very high density of data stored on such disks, topographic profiles with heights ranging from less than one nm to tens of microns are monitored at a lateral resolution on the order of one micron.

In some storage devices such as hard disk drives, a read/write head is disposed closely adjacent a rotating disk. The read/write head enables magnetic (rather than physical) access to the disk to read and/or write bits of data. However, if the read/write head touches the disk surface, the data that is magnetically stored on the disk may be damaged. Also, damage to the head may occur if the head physically contacts the rotating disk. In some current hard disk drives, extensive damage may be caused to both the head and the rotating disk surface if they physically come in contact, since the disks can spin at speeds of several thousands of revolutions per minute (RPM).

To store as much data as possible in a given footprint of a hard disk drive, the heads are kept at increasingly shorter distances from the rotating disks. Hence, accurate measurement of the distance between the head and the rotating disk is useful.

SUMMARY

In various embodiments, techniques for dynamic reference plane compensation in measurement and/or testing environments are described. The measurement and/or testing environment may include an environment for measuring the distance between two surfaces such as, e.g., the distance between a surface of a rotating disk and an external object. Alternatively or in addition, the measurement and/or testing environment may include an environment for measuring aspects of a surface of a rotating disk.

In one embodiment, a technique for dynamic reference plane compensation encompasses a method of dynamic reference plane compensation. In one embodiment, radiation from a first radiation source is impinged onto a surface of an object. An uncompensated measurement signal is generated from radiation reflected from a first location on the surface and a second location, and a compensation signal is generated from radiation reflected from a third location and a fourth location on the surface. A compensated measurement signal is generated using the uncompensated measurement signal and the compensation signal.

In another embodiment, a system for dynamic reference plane compensation comprises a radiation directing assembly to impinge radiation from a first radiation source onto a first surface of an object; a measurement signal generating assembly to generate an uncompensated measurement signal from radiation reflected from a first location on the surface and a second location; a compensation signal generating assembly to generate a compensation signal from radiation reflected from a third location and a fourth location on the surface; and a compensated measurement signal generating assembly to generate a compensated measurement signal from the uncompensated measurement signal and the compensation signal.

In another embodiment, a method of measuring a distance between a disk surface and a read/write head comprises rotating the object about a central axis; directing radiation from a first radiation source onto a first location on a first surface of the object and onto the test block at a second location adjacent the first location; directing radiation from a second radiation source onto a third location and a fourth location on the first surface of the object; generating an uncompensated measurement signal from radiation reflected from a first location on the surface and the test block; generating a compensation signal from radiation reflected from a third location and a fourth location on the surface of the object; generating a compensated measurement signal from the uncompensated measurement signal and the compensation signal; and determining the distance between the first surface of the disk and the read/write head from the compensated measurement signal.

Additional advantages, objects and features of embodiments of the invention are set forth in part in the detailed description which follows. It is to be understood that both the foregoing general description and the following detailed description are merely exemplary of embodiments of the invention, and are intended to provide an overview or framework for understanding the nature and character of embodiments of the invention.

BRIEF DESCRIPTION OF THE DRAWINGS

The detailed description is described with reference to the accompanying figures.

DETAILED DESCRIPTION

In the following description, numerous specific details are set forth to provide a thorough understanding of embodiments of the present invention. Embodiments of the present invention may be practiced without some or all of these specific details. In other instances, well known process operations have not been described in detail in order not to unnecessarily obscure the present invention.

Also, reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Figure 1:
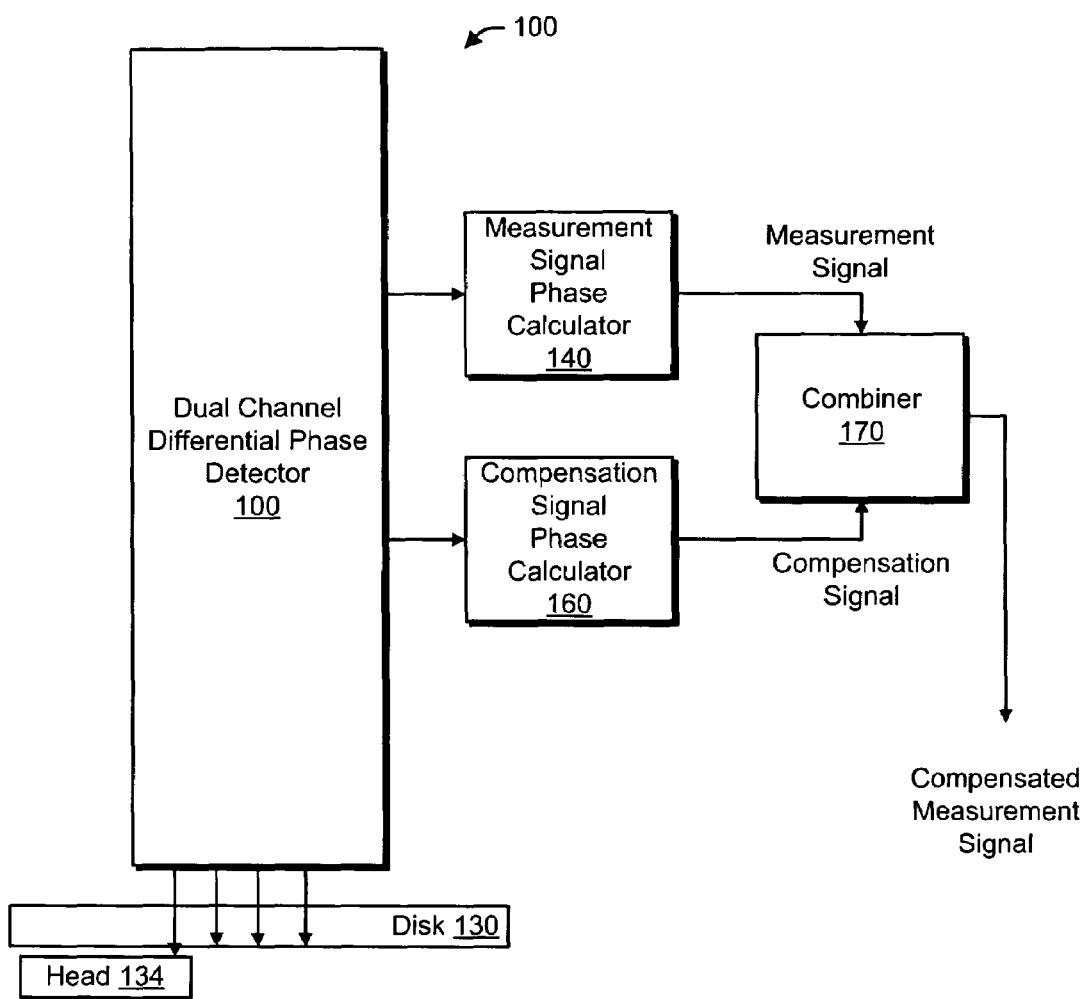
FIG. 1 is a schematic illustration of a system for dynamic reference plane compensation according to one embodiment.

FIG. 1 is a schematic illustration of a system for dynamic reference plane compensation according to one embodiment. Referring to FIG. 1, the system comprises a dual channel differential phase detector 100, a measurement signal phase calculator 140, a compensation signal phase calculator 160, and a combiner 170. In one embodiment the dual channel differential phase detector 100 is adapted to measure the distance between a rotating disk 130 and a device that simulate a head 134 such as, e.g., a read/write head. In this embodiment rotating disk 130 may be manufactured from glass or another material that permits electromagnetic radiation to pass through the disk 130, and the device 134 that simulates a head may be manufactured from a material that reflects electromagnetic radiation such as, e.g., AlTiC (Alumina Titanium Carbide).

In operation, the dual channel differential phase detector 100 directs multiple beams of radiation onto the disk 130. At least one radiation beam may pass through the disk 130 and is reflected from the device 134 that simulates a head. Further, at least one beam is reflected from the bottom surface of the disk 130. As will be further discussed herein, e.g., with reference to FIGS. 2 and 3, the phase difference resulting from the optical path difference between the beams may be used by the measurement signal phase calculator 140 to measure the gap between the bottom surface of the disk 130 and the device 134 that simulates a head. The measurement signal phase calculator 140 outputs a signal indicative of the gap between the bottom surface of the disk 130 and the device 134 that simulates a head.

In one embodiment, the system is adapted to compensate for dynamic changes in the reference plane that may result, e.g., from changes in the relative position of the detector 100 and the disk 130. To compensate for dynamic changes in the reference plane, the dual channel differential phase detector 100 directs one or more additional beams of radiation onto the disk 130. A compensation signal phase calculator 160 determines and outputs compensation signal. The measurement signal and the compensation signal are directed to a combiner 170, which combines the signal to generate a compensated measurement signal.

Figure 2:
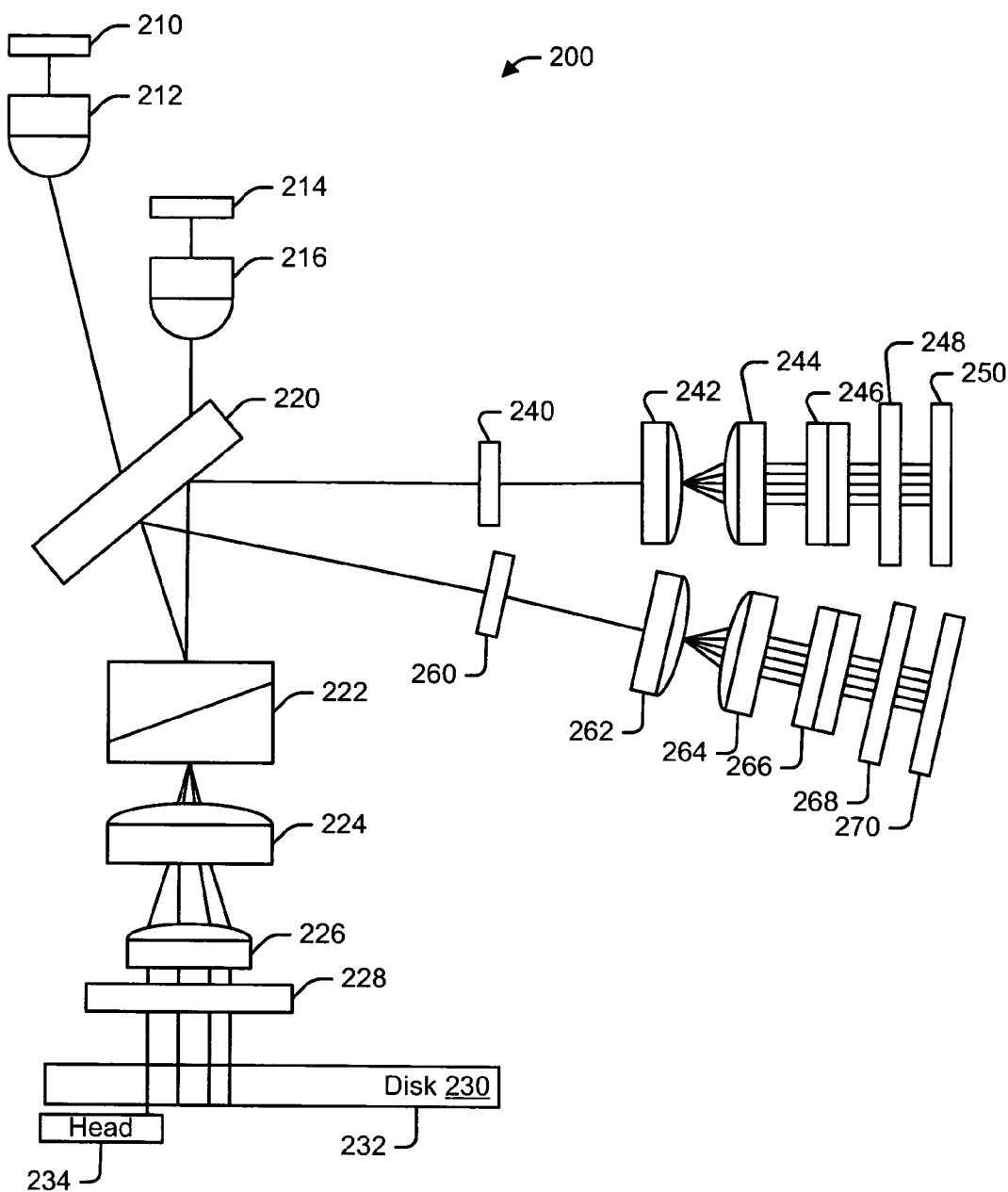
FIG. 2 is a schematic illustration of a dual channel differential phase detector according to one embodiment.

In one embodiment dual channel differential phase detector 100 uses principles of optical interferometers. Exemplary optical interferometers are disclosed in U.S. Pat. Nos. 5,392,116 and 6,687,008, the disclosures of which are incorporated herein by reference. FIG. 2 is a schematic illustration of a dual channel differential phase detector 200 according to one embodiment. Referring to FIG. 2, detector 200 includes a first laser diode 210 and collimating lens 212, and a second laser diode 214 and collimating lens 216, a beam splitter 220, a Wollaston prism 222, and focusing lenses 224, 226. In alternate embodiments, the laser diodes may be replaced by any suitable light source, such as non-semiconductor lasers, Xe arc lamps, Mercury vapor lamps, Light Emitting Diodes (LED), incandescent bulb, etc. In alternate embodiments, said light sources can be split to generate the beams suitable for the measurement and the compensation channel.

Optionally, the detector 200 includes a shroud 228 to reduce negative effects in the measurement environment.

Detector 200 includes a measurement signal generating assembly that comprises a diffraction grating 240, focusing lenses 242, 244, a phase shifter 246, a polarizer 248, and a detector assembly 250. Detector 200 further includes a compensation signal generating assembly that comprises a diffraction grating 260, focusing lenses 262, 264, a phase shifter 26, a polarizer 268, and a detector assembly 270.

In operation diodes 210 produces a first beam of radiation which passes through collimating lens 212, and beam splitter 220. Wollaston prism 222 splits the first beam of radiation into a first portion and a second portion, which are directed through lenses 224 and 226. Similarly, diode 214 produces a second beam of radiation which passes through collimating lens 216, and beam splitter 220. Wollaston prism 222 splits the second beam of radiation into a third portion and a fourth portion, which are directed through lenses 224 and 226.

One of the first radiation beam or the second radiation beam functions as a measurement beam, and the other functions as a compensation beam. Solely for the purpose of explanation, this description designates the second radiation beam generated by diode 214 as the measurement beam.

A first portion of the measurement beam is reflected from a first position on the bottom surface of disk 230, and a second portion of the measurement beam is reflected from the surface of the device 234 that simulates a head. The reflected portions of the measurement beam pass back through lenses 226, 224, and are recombined into a superimposed light beam by the Wollaston prism 222. The superimposed light beam is reflected from the beam splitter 220 to the measurement signal generating assembly.

The reflected beam passes through diffraction grating 240, which divides the superimposed light beam into multiple pairs of diffraction orders, each of which is a superposition of the diffraction orders of two reflected light beams. Lenses 242, 244 focus the diffraction orders as axially parallel equidistant light beams onto a phase shifter 246, a polarizer 248, and a detector assembly 250. Detector assembly uses the phase difference between the first portion of the measurement beam reflected from the surface of the device 234 that simulates a head and the second portion of the measurement beam reflected from the bottom surface of disk 230 to generate a signal that is a function of the distance between these surfaces. In this embodiment, the detector assembly uses a technique substantially as described in U.S. Pat. No. 5,392,116.

The compensation beam is divided into a third portion and a fourth portion, as described above, both of which are reflected from respective positions on the bottom surface of disk 230. The compensation beam is directed from the beam splitter 220 into the compensation signal generating assembly, which includes components analogous to those in the measurement signal generating assembly. The detector assembly 270 generates a compensation signal from the phase difference between the first portion of the compensation beam reflected from a first point on the bottom surface of disk 230 and the second portion of the compensation beam reflected from a second point on the bottom surface of disk 230. The compensation signal is a function of the difference in the optical paths of the two portions of the compensation beam. Hence, the compensation signal will vary in accordance with variations in the relative position of the detector 200 and the disk 230.

Referring back to FIG. 1, in one embodiment the measurement signal(s) output from detector 250 are input to the measurement signal phase calculator, which calculates a phase difference $\theta$ between the reflected components of the measurement signal. Similarly, the compensation signal(s) output from the detector 270 are input to the compensation signal phase calculator 160, which calculates a phase difference $\theta_{aux}$ between the reflected components of the measurement signal. Combiner 170 combines these signals to produce a corrected phase signal that compensates for errors introduced by the changes in the relative position of the detector 250 and the object under test. In one embodiment the corrected phase signal is calculated using the formula:

$$\theta_{corr} = \theta - \theta_{aux}(d/d_{aux})(\lambda_{aux}/\lambda)$$

where:

$\theta_{corr}$ is the corrected phase difference, $\theta$ is the phase difference measured between the measurement beams, $\theta_{aux}$ is the phase difference measured between the compensation beams, d is the distance between the point of incidence of the first portion of the measurement beam and the point of incidence of the second portion of the measurement beam, and $d_{aux}$ is the distance between the point of incidence of the first portion of the compensation beam and the point of incidence of the second portion of the compensation beam.

$\lambda$ is the wavelength of the radiation used for the measurement beam $\lambda_{aux}$ is the wavelength of the radiation used for the compensation beam It is to be noted that the formula and example embodiment described above are for the case where the measurement spots first and second location) and the compensation spots (third and fourth location) respectively define two segments substantially parallel to each others. In this case, the compensation signal is directly proportional to the error that needs to be compensated out of the measurement, hence the simple formula. The following claims also encompass cases where more than two compensation spots (and/or more than one compensation signal) are used, not necessarily substantially parallel to the segment defined by the measurement spots, to allow determination of the measurement error to be compensated for by simple algebraic combination of said compensation signals.

In one embodiment the measurement signal phase calculator 140, the compensation signal phase calculator 160, and the combiner 170 may be embodied as logic instructions stored in a computer-readable medium and executable on a suitable processor. The logic instructions may be embodied as software stored in a suitable memory such as, e.g., a volatile or nonvolatile memory module of a general purpose computing device. When executed, the logic instructions configure the general purpose computing device to execute the operations of the logic instructions. In alternate embodiments the logic instructions may be embodied as firmware, or reduced to hard-wired, dedicated circuitry. In another embodiment, the detectors receiving the measurement and the compensation channel may be one detector, e.g. a camera (CCD, CMOS or any suitable type) or a specialized pixel array of any suitable kind.

The embodiments depicted in FIGS. 1-2 illustrate radiation reflecting from four distinct spots, three of which are on the surface of the disk. In practice, only three distinct spots are necessary. A measurement signal may be generated from characteristics of radiation reflected from a first spot and a second spot, and a compensation signal may be generated from characteristics of radiation reflected from a third spot and either the first spot or the second spot. Hence, as used herein, references to first, second, or third points on the surface of the disk do not require that the all points be discreet; two of the points can overlap or be identical.

Figure 3:
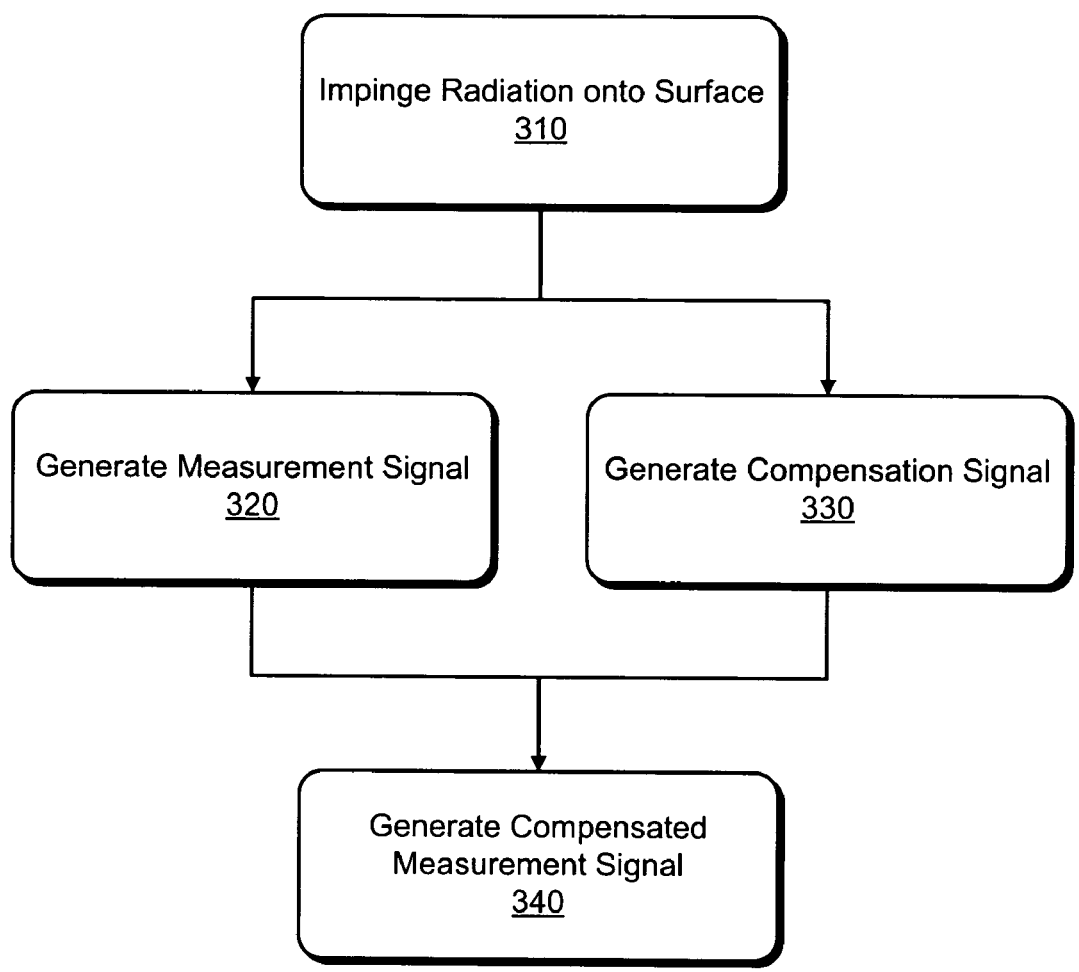
FIG. 3 is a flow diagram of a method for dynamic reference plane compensation according to one embodiment.

FIG. 3 is a flow diagram of a method for dynamic reference plane compensation according to one embodiment. At operation 310 radiation is impinged onto a surface such as, e.g., the surface of a rotating disk. In one embodiment the radiation comprises a measurement laser beam and a compensation laser beam, as described herein. At operation 320 a measurement signal is generated. In one embodiment the measurement signal represents a phase difference between two reflected components of the measurement signal. At operation 330 a compensation signal is generated. In one embodiment the compensation signal represents a phase difference between two reflected components of the compensation signal. Operations 320 and 330 may be performed contemporaneously. At operation 340 a compensated measurement signal is generated. In one embodiment the compensated measurement signal is calculated as described above.

Hence, in embodiments described herein a dual interferometer utilizes a first interferometer that generates a signal representative of a distance measurement and an auxiliary interferometer that generates a signal representative of errors introduced into the measurement signal by, e.g., from changes in the relative position of the detector and the disk, or by variations in surface. The auxiliary signal may be used to correct the measurement signal.

In alternate embodiments a single laser source may be used and may be split into a separate measurement beam and compensation beam, which may be processed as described above.

In alternate embodiments the measurement beam may be used to measure differences in the cross-sectional profile of a surface of, e.g., a disk or a semiconductor substrate.

In various embodiments, the techniques discussed herein may allow the slider or read/write head of a hard disk drive to fly closer to the rotating disk to provide repeatedly in manufacturing and/or testing of hard disk drives. The techniques may also increase sensitivity and/or decrease measurement noise, e.g., to provide more accurate measurement of the gap between a rotating disk and a slider in an optical flying height tester. As this gap is reduced, the magnetic spacing is also reduced which enables hard disk drive designs with more compact footprints.

In the description and claims, the terms "coupled" and "connected," along with their derivatives, may be used. In some embodiments of the invention, "connected" may be used to indicate that two or more elements are in direct physical contact with each other. "Coupled" may mean that two or more elements are in direct physical contact. However, "coupled" may also mean that two or more elements may not be in direct contact with each other, but may still cooperate or interact with each other.

Although embodiments have been described in language specific to structural features and/or methodological acts, it is to be understood that claimed subject matter may not be limited to the specific features or acts described. Rather, the specific features and acts are disclosed as sample forms of implementing various embodiments. While the invention has been described above in conjunction with one or more specific embodiments, it should be understood that the invention is not intended to be limited to one embodiment. The invention is intended to cover alternatives, modifications, and equivalents as may be included within the spirit and scope of the invention, such as those defined by the appended claims.

What is claimed is:

1. A method of dynamic reference plane compensation, comprising:

impinging radiation from a first radiation source onto a surface of an object;

generating an uncompensated measurement signal from radiation reflected from a first location on the surface and a second location;

generating a compensation signal from radiation reflected from a third location and a fourth location on the surface; and generating a compensated measurement signal using the uncompensated measurement signal and the compensation signal;

wherein the compensated measurement signal comprises a corrected phase signal calculated using the formula:

$$\theta_{corr} = \theta - \theta_{aux}(d/d_{aux})(\lambda_{aux}/\lambda)$$

where:

$\theta_{corr}$ is the corrected phase difference;

$\theta$ is the phase difference measured between the measurement beams;

$\theta_{aux}$ is the phase difference measured between the compensation beams;

d is the distance between the point of incidence of the first portion of the measurement beam and the point of incidence of the second portion of the measurement beam;

$d_{aux}$ is the distance between the point of incidence of the first portion of the compensation beam and the point of incidence of the second portion of the compensation beam;

$\lambda$ is the wavelength of the radiation used for the measurement beam $\lambda_{aux}$ is the wavelength of the radiation used for the compensation beam.

2. The method of claim 1, further comprising impinging radiation from a second radiation source onto a first surface of an object.

3. The method of claim 1, wherein generating an uncompensated measurement signal from radiation reflected from a first location on the surface and a second location comprises determining a phase difference between radiation reflected from the first location and the second location.

4. The method of claim 1, wherein generating a compensation signal from radiation reflected from a third location on the surface and a fourth location on the surface comprises determining a phase difference between radiation reflected from the third location and the fourth location.

5. The method of claim 1, wherein generating a compensated measurement signal comprises determining a difference between the first measurement signal and the compensation signal.

6. A system for dynamic reference plane compensation, comprising:

a radiation directing assembly to impinge radiation from a first radiation source onto a first surface of an object;

a measurement signal generating assembly to generate an uncompensated measurement signal from radiation reflected from a first location on the surface and a second location;

a compensation signal generating assembly to generate a compensation signal from radiation reflected from a third location and a fourth location on the surface; and a compensated measurement signal generating assembly to generate a compensated measurement signal from the uncompensated measurement signal and the compensation signal;

wherein the compensated measurement signal comprises a corrected phase signal calculated using the formula:

$$\theta_{corr} = \theta - \theta_{aux}(d/d_{aux})(\lambda_{aux}/\lambda)$$

where:

$\theta_{corr}$ is the corrected phase difference;

$\theta$ is the phase difference measured between the measurement beams;

$\theta_{aux}$ is the phase difference measured between the compensation beams;

d is the distance between the point of incidence of the first portion of the measurement beam and the point of incidence of the second portion of the measurement beam;

$d_{aux}$ is the distance between the point of incidence of the first portion of the compensation beam and the point of incidence of the second portion of the compensation beam;

$\lambda$ is the wavelength of the radiation used for the measurement beam $\lambda_{aux}$ is the wavelength of the radiation used for the compensation beam.

7. The system of claim 6, wherein the radiation directing assembly comprises:

a first laser diode to generate a first laser beam for the measurement signal;

a second laser diode to generate a second laser beam for the compensation signal.

8. The system of claim 7, wherein the radiation directing assembly comprises:

a single optical assembly to direct a portion of the first laser beam and a portion of the second laser beam onto the surface.

9. The system of claim 6, wherein the measurement signal generating assembly comprises:

a diffraction grating;

a phase shifting assembly; and a signal generating assembly to generate a measurement signal based on a phase difference between radiation reflected from the first location and the second location.

10. The system of claim 6, wherein the compensated measurement signal generating assembly comprises:

means for calculating a phase difference from the measurement signal;

means for calculating a phase difference for the compensation signal;

means for generating a compensated measurement signal from the first measurement signal and the compensation signal.

11. A method of measuring a distance between a surface of an object and a test block, comprising:

rotating the object about a central axis;

directing radiation from a first radiation source onto a first location on a first surface of the object and onto the test block at a second location adjacent the first location;

directing radiation from a second radiation source onto a third location and a fourth location on the first surface of the object;

generating an uncompensated measurement signal from radiation reflected from a first location on the surface and the test block;

generating a compensation signal from radiation reflected from a third location and a fourth location on the surface of the object;

generating a compensated measurement signal from the uncompensated measurement signal and the compensation signal; and determining the distance between the first surface of the object and the test block from the compensated measurement signal;

wherein the compensated measurement signal comprises a corrected phase signal calculated using the formula:

$$\theta_{corr} = \theta - \theta_{aux}(d/d_{aux})(\lambda_{aux}/\lambda)$$

where:

$\theta_{corr}$ is the corrected phase difference;

$\theta$ is the phase difference measured between the measurement beams;

$\theta_{aux}$ is the phase difference measured between the compensation beams;

d is the distance between the point of incidence of the first portion of the measurement beam and the point of incidence of the second portion of the measurement beam;

$d_{aux}$ is the distance between the point of incidence of the first portion of the compensation beam and the point of incidence of the second portion of the compensation beam;

$\lambda$ is the wavelength of the radiation used for the measurement beam $\lambda_{aux}$ is the wavelength of the radiation used for the compensation beam.

12. The method of claim 11, wherein directing radiation from a first radiation source onto a first location on a first surface of the object and onto the read/write head at a second location adjacent the first location comprises transmitting a laser beam through an optical assembly that splits the laser beam into a first beam and a second beam.

13. The method of claim 11, wherein directing radiation from a second radiation source onto a third location and a fourth location on the first surface of the object comprises transmitting a laser beam through an optical assembly that splits the laser beam into a third beam and a fourth beam.

14. The method of claim 11, wherein the radiation from the first radiation source and the radiation from the second radiation source are transmitted through a common optical assembly.

15. The method of claim 11, wherein generating a first measurement signal from radiation reflected from a first location on the surface of the object and the test block comprises determining a phase difference between radiation reflected from the first location and the test block.

16. The method of claim 11, wherein generating a compensation signal from radiation reflected from a third location and a fourth location on the surface comprises determining a phase difference between radiation reflected from the third location and the fourth location.

17. The method of claim 11, wherein generating a compensated measurement signal from the first measurement signal and the compensation signal comprises determining a difference between the first measurement signal and the compensation signal.

* * * * *